(12) United States Patent  
Noh et al.

(10) Patent No.: US 12,118,595 B2
(45) Date of Patent: Oct. 15, 2024

(54) AUTONOMOUS VEHICLE FITTING ROOM

(71) Applicant: GM Cruise Holdings LLC, San Francisco, CA (US)

(72) Inventors: Grace Noh, San Francisco, CA (US); Alexander Willem Gerrese, San Francisco, CA (US); Aakanksha Mirdha, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 221 days.

(21) Appl. No.: 17/495,188

(22) Filed: Oct. 6, 2021

(65) Prior Publication Data

US 2023/0109611 A1   Apr. 6, 2023

(51) Int. Cl.
| | |
|---|---|
| *G06Q 30/00* | (2023.01) |
| *G06Q 10/083* | (2023.01) |
| *G06Q 20/12* | (2012.01) |
| *G06Q 30/0601* | (2023.01) |

(52) U.S. Cl.
CPC ....... *G06Q 30/0601* (2013.01); *G06Q 10/083* (2013.01); *G06Q 20/12* (2013.01)

(58) Field of Classification Search
None
See application file for complete search history.

(56) References Cited

U.S. PATENT DOCUMENTS

| | | | |
|---|---|---|---|
| 1,741,424 A | 12/1929 | Lundstrom | |
| 10,241,516 B1 * | 3/2019 | Brady | G05D 1/0027 |
| 2016/0239803 A1 * | 8/2016 | Borley | G06Q 10/08355 |
| 2019/0107402 A1 * | 4/2019 | Sato | G06V 20/63 |
| 2019/0176660 A1 * | 6/2019 | Xiao | B60R 11/0235 |
| 2019/0311417 A1 * | 10/2019 | Randisi | G06Q 50/30 |
| 2021/0053233 A1 * | 2/2021 | Hatayama | G06V 20/20 |
| 2021/0256472 A1 * | 8/2021 | Javidan | G07C 9/00896 |
| 2021/0383699 A1 * | 12/2021 | Xiao | B60W 30/06 |

OTHER PUBLICATIONS

Car Rental Glossary, "Ride Hailing-What it is and how it works?" Apr. 12, 2021, 1pg. (Year: 2021).*
"Smart Parking Applications and Its Efficiency," Kalasova, Alica; Culik, Kristian; Poliak, Milos; Otahalova, Zuzana; ulk, Kristin. SUSTAINABILITY 13.11 MDPI. (Jun. 2021); Dialog #000660771900001, 9pgs. (Year: 2021).*

* cited by examiner

*Primary Examiner* — Robert M Pond

(57) ABSTRACT

Systems and methods for providing an autonomous vehicle fitting room. In particular, systems and methods are provided for users to try ordered products in an autonomous vehicle at the time of delivery. Users can then take selected products from the autonomous vehicle and/or leave other products in the autonomous vehicle to be returned automatically. The autonomous vehicle can be configured to determine which products were taken and automatically charge a user account for these products.

16 Claims, 10 Drawing Sheets

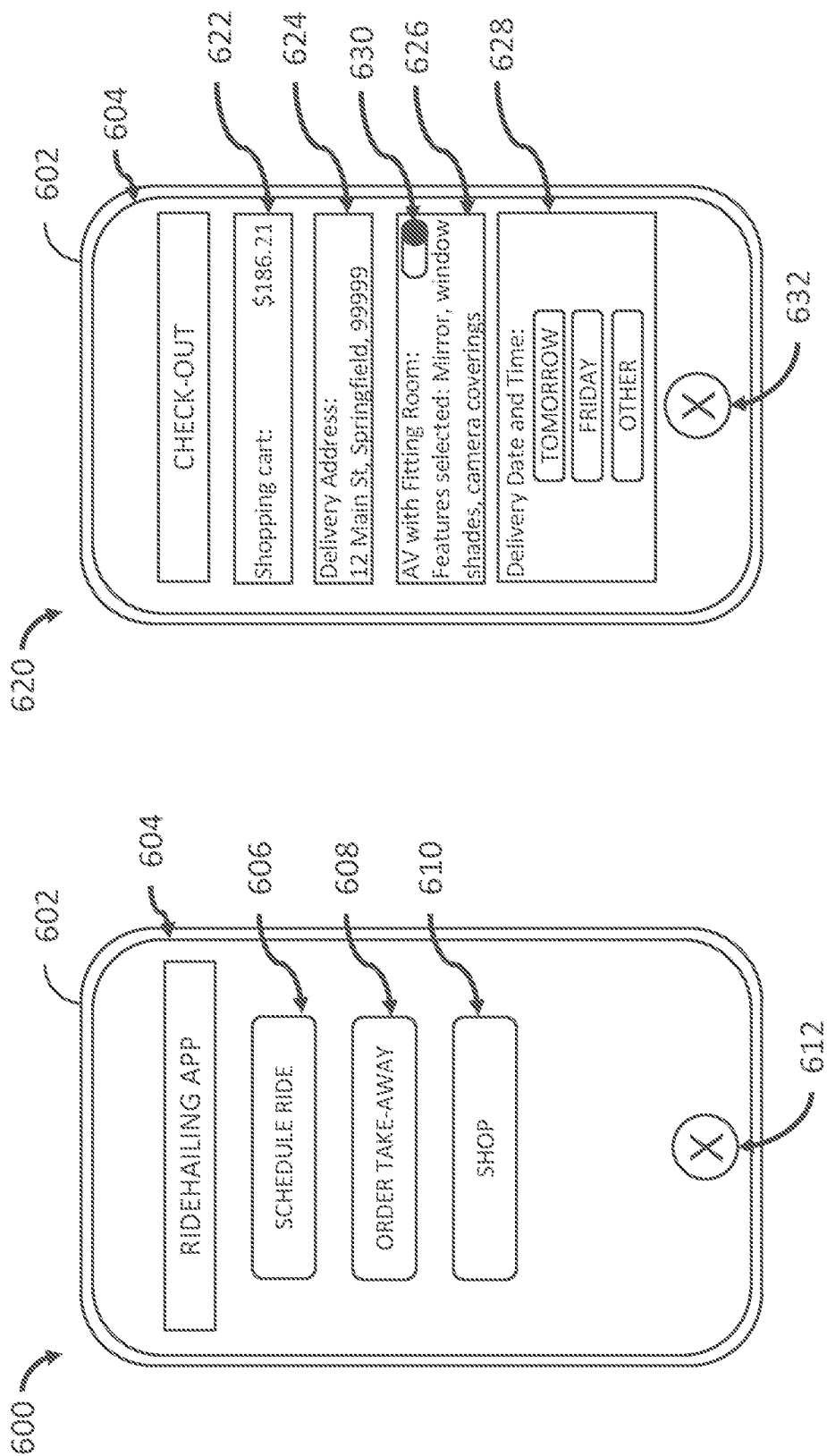

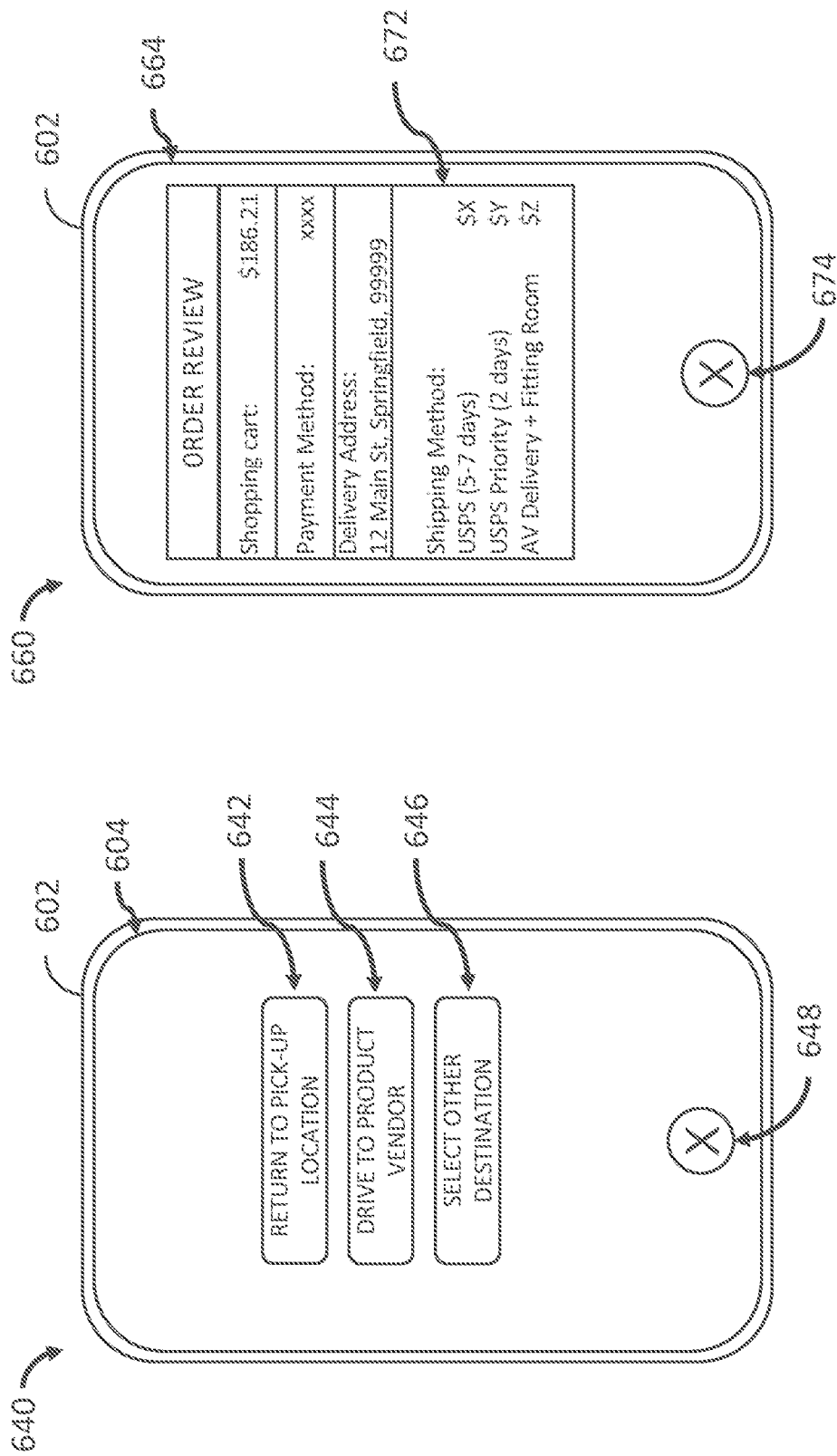

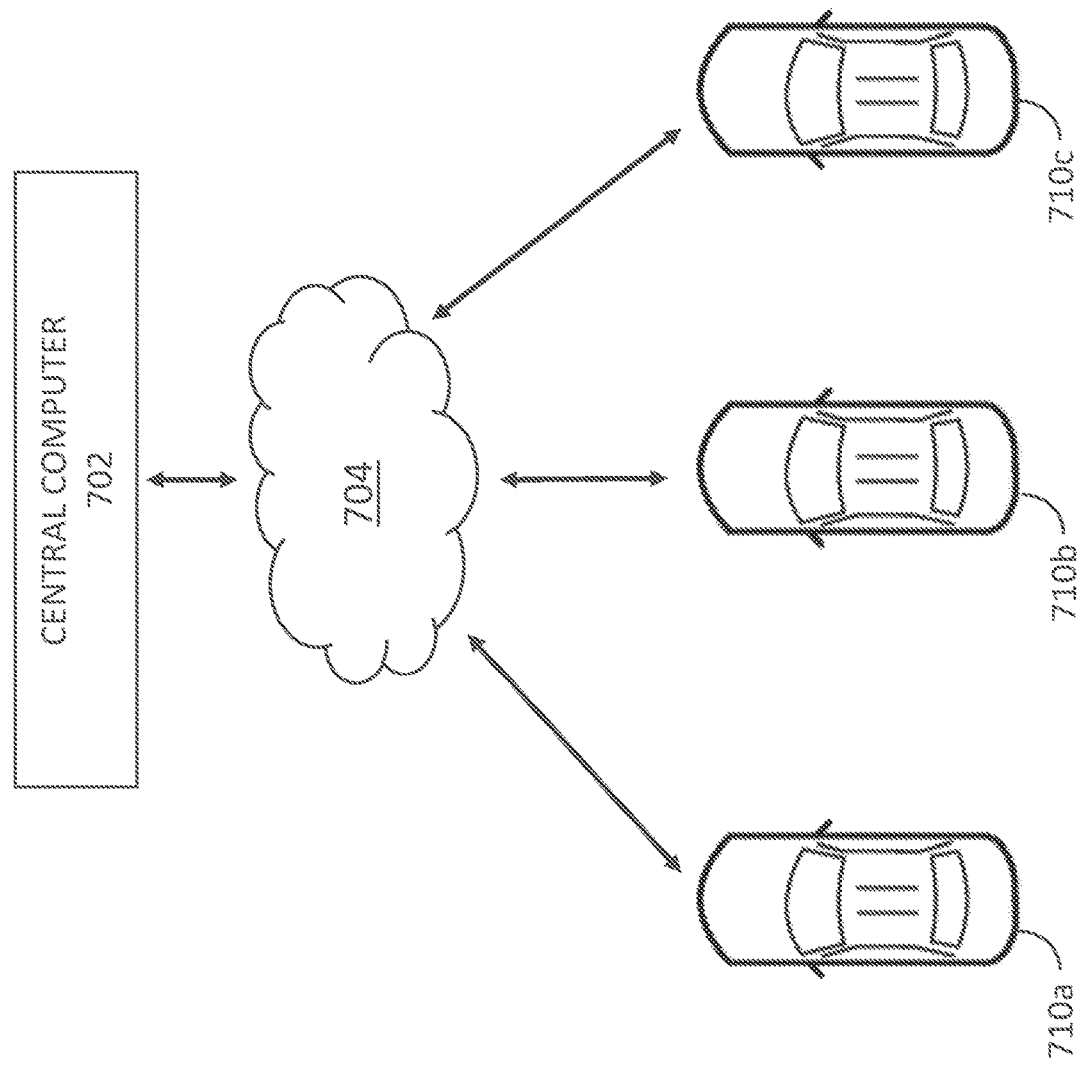

AUTONOMOUS VEHICLE FITTING ROOM

FIELD OF THE DISCLOSURE

The present disclosure relates generally to autonomous vehicles (AVs) and to systems and methods for product orders.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be used to deliver products ordered online. When shopping online, one barrier to finalizing product purchases is uncertainty regarding the actual product. Generous return policies can help alleviate this issue by allowing no-questions-asked returns. However, returning items can still be inconvenient.

SUMMARY

Systems and methods are provided for autonomous vehicle fitting rooms. In particular, systems and methods are provided for users to try ordered products in an autonomous vehicle at the time of delivery. Users can then take selected products from the autonomous vehicle and/or leave other products in the autonomous vehicle to be returned automatically.

According to one aspect, a method for providing a fitting room in an autonomous vehicle, comprises: arriving at a delivery location with an order; authenticating user identity; unlocking a vehicle door, allowing user access to an interior cabin and the order; providing an environment for trying the order; and determining, when the interior cabin is vacated, whether at least a portion of the order remains inside the interior cabin.

According to some implementations, the portion is a first portion and further comprising, when the first portion of the order remains inside the interior cabin: identifying the first portion of the order for return; determining a second portion of the order was removed; and charging a user account for the second portion of the order, wherein the user account corresponds with the user identity. According to some implementations, the method further comprises determining whether to park the autonomous vehicle based on at least one of a user request, an order type, and parking space availability. According to some implementations, the method further comprises driving to a selected location, dropping off a user with at least one item from the order, and waiting for user return. In some implementations, the selected location includes one of a running track and a pool. In some implementations, the method further comprises locking vehicle doors after dropping off the user at the selected location to keep other items safe in vehicle the while user tries at least one item from the order.

According to some implementations, providing an environment for trying the order further comprises at least one of triggering window tinting and physically blocking camera lenses. According to some implementations, providing an environment for trying the order further comprises providing at least one of a mirror, an outlet, a table, a desk, and a bed.

According to some implementations, the method further comprises receiving an order delivery request including the delivery location and a fitting room request. In some implementations, the order delivery request is from a third party shopping application. According to some implementations, receiving the order delivery request comprises receiving an order submission including the order delivery request through a ridehailing application. According to some implementations, receiving the order delivery request comprises receiving the order delivery request and an order pick-up location from a third party.

According to some implementations, the method further comprises unlocking a container in the autonomous vehicle, wherein the order is in the container. According to some implementations, the method further comprises presenting a first option to drive to a local business, wherein the local business filled the order. According to some implementations, the order is a first order, and further comprising presenting a second option to place an additional order for pick-up at the local business.

According to another aspect, an autonomous vehicle for providing a fitting room, comprises: an interior cabin having a space configured to provide an environment for trying an order; a plurality of containers, wherein a first container of the plurality of containers holds the order; a plurality of sensors configured to detect items in the interior cabin; and an onboard computer configured to: authenticate a user identity, unlock a vehicle door and the first container, allowing user access to the interior cabin and the order; and determine, when the interior cabin is vacated, whether at least a portion of the order remains inside the interior cabin, based on data from the plurality of sensors.

According to some implementations, the interior cabin includes at least one of window shades, window tinting, camera lens covers, a mirror, an outlet, a table, a desk, and a bed. According to some implementations, the portion is a first portion and wherein, when the first portion of the order remains inside the interior cabin, the onboard computer is further configured to: identify the first portion of the order for return; determine a second portion of the order was removed from the autonomous vehicle; and charge a user account for the second portion of the order, wherein the user account corresponds with the user identity.

According to another aspect, a system for providing a fitting room in an autonomous vehicle fleet, comprises: an online portal configured to receive an order delivery request including a pick-up location, a delivery location, and a fitting room request; and a central computing system configured to: receive the order delivery request; select an autonomous vehicle having a fitting room from the autonomous vehicle fleet; and schedule the selected autonomous vehicle to pick up an order corresponding to the order delivery request from the pick-up location, drive to the delivery location, and wait a selected period of time during user access to the fitting room.

According to some implementations, following order delivery by the autonomous vehicle, the central computing system is further configured to: receive order feedback from the autonomous vehicle, wherein the order feedback includes a determination of whether at least a portion of the order was removed from the autonomous vehicle, and, if at least the portion of the order was removed, an identification of items in the portion; and if at least the portion of the order was removed, charge a user account for the items in the portion.

According to some implementations, the online portal is further configured to receive the order delivery request from one of a ridehailing application and a third party. According to some implementations, the fitting room request includes fitting room details including at least one of window shades, window tinting, camera lens covers, a mirror, an outlet, a table, a desk, and a bed. According to some implementations, the fitting room request includes a fitting room location, and wherein the onboard computing system is further configured to schedule the selected autonomous vehicle to drive from the delivery location to the fitting room location.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which:

FIGS. 6A-6D show examples of a device interface for autonomous vehicle fitting rooms, according to various embodiments of the disclosure;

FIG. 7 is a diagram illustrating a fleet of autonomous vehicles in communication with a central computer, according to some embodiments of the disclosure.

DETAILED DESCRIPTION

Overview

Systems and methods are provided for autonomous vehicle fitting rooms. In particular, systems and methods are provided for users to try ordered products in an autonomous vehicle at the time of delivery. Users can then take selected products from the autonomous vehicle and/or leave other products in the autonomous vehicle to be returned automatically. The autonomous vehicle can be configured to determine which products were taken and automatically charge a user account for those items.

One of the largest barriers to online shopping is the uncertainty that stems from the inability to try products out—whether it's not knowing what size jacket to buy from a particular brand, what resolution a home projector actually emits, or what an abstractly defined scented candle such as "reflection and clarity" smells like. Generous return policies have helped alleviate this issue by theoretically allowing no-questions-asked returns on most products. But, in practice, the returns process can be so involved that people are still hesitant to make purchases. Additionally, the returns process can be so involved that many people never return an item that they will never use and intended to return.

Systems and methods are provided herein to overcome some of these hurdles and provide solutions to the problem of returns entirely by enabling consumers to physically try the product at the time of delivery in an autonomous vehicle. In particular, when an autonomous vehicle is used for product delivery, a consumer can spend some amount of time inside the autonomous vehicle with the product. The consumer can simply take the products they like and leave the rest inside the cabin to be returned automatically. Alternatively, a consumer can have the autonomous vehicle wait a short period of time and then return any unwanted items to the vehicle.

Example Autonomous Vehicle Configured for Providing Ordered Products

Figure 1:
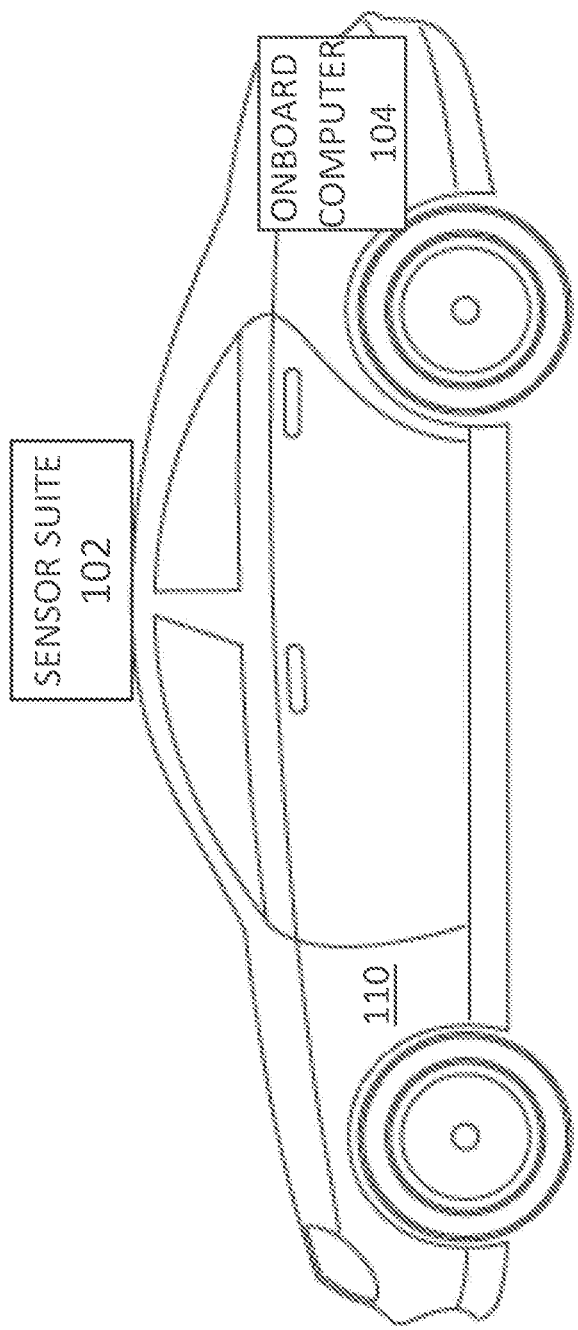
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for providing ordered products to users. In some examples, the autonomous vehicle 110 is configured for users to try products inside the vehicle.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, data from the sensor suite 102 can be used to detect a passenger exiting a vehicle and/or to determine that a passenger has exited a vehicle. In some examples, the sensor suite 102 can be used to track initial movements of the passenger after the passenger exits the vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the cameras include shutters that can be closed for privacy of people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

In some implementations, the autonomous vehicle 110 includes compartments for storing products ordered by passengers. In some examples, the compartments are locked, and a user can unlock a compartment using a mobile device and/or a tablet inside the autonomous vehicle 110. Sensors inside the autonomous vehicle 110 can be used to detect whether a compartment has been opened. Additionally, sensors within the compartment can be used to determine whether a product was removed from the compartment. When an order includes multiple products, and some products are returned to the compartment, additional sensors can be used to determine which products were returned and which products were taken by the user.

The onboard computer 104 functions to control the operations and functionality of the autonomous vehicle 110 and processes sensed data from the sensor suite 102 and/or other sensors in order to determine states of the autonomous vehicle 110. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for an Autonomous Vehicle Fitting Room

Figure 2:
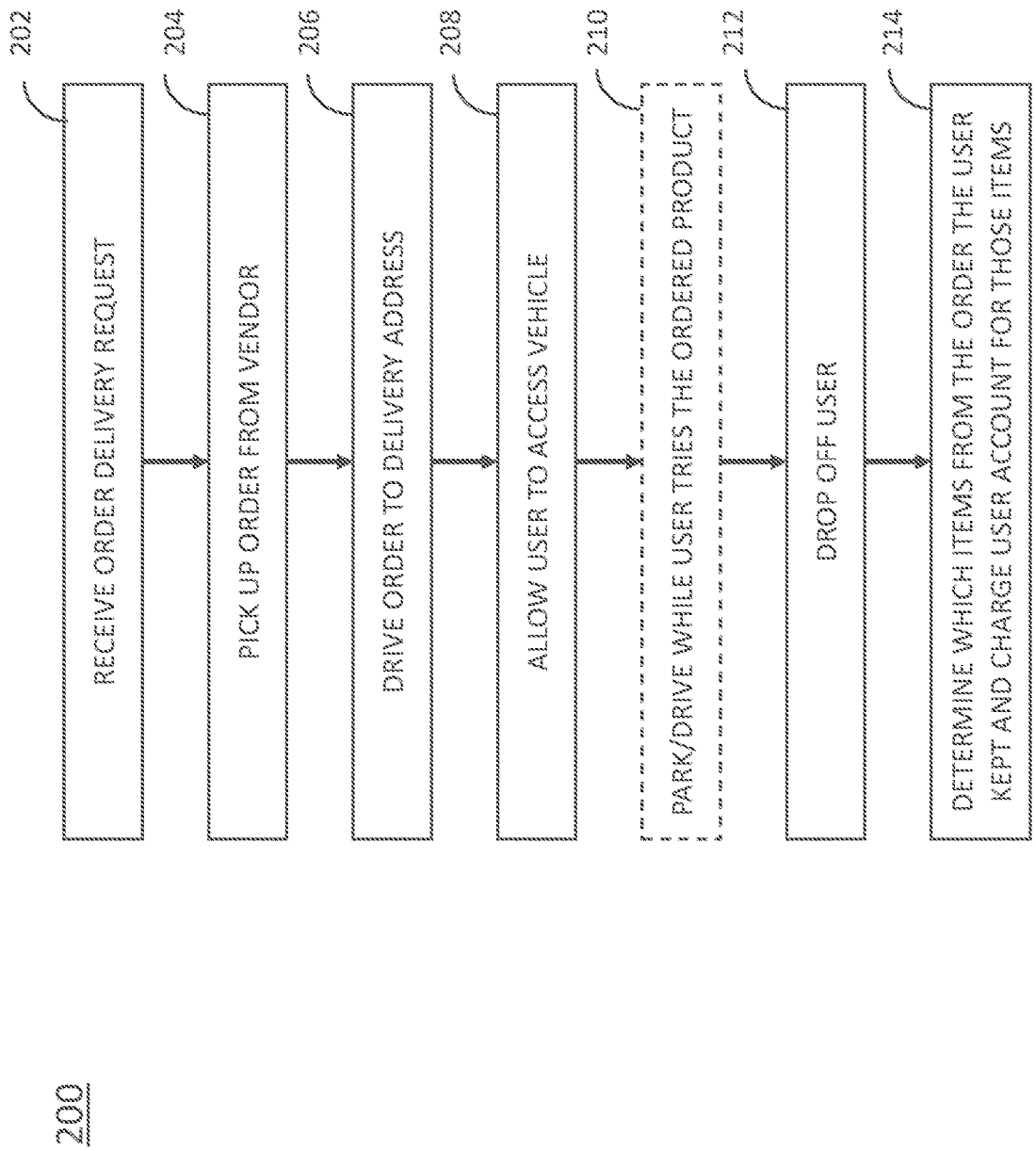
FIG. 2 is a diagram illustrating a method for an autonomous vehicle fitting room, according to some embodiments of the disclosure.

FIG. 2 is a diagram illustrating a method 200 for providing an autonomous vehicle fitting room, according to various embodiments of the disclosure. In particular, the method 200 is a method for customers to try ordered products inside of the autonomous vehicle and pick and choose what to keep and what to return. To begin, a user shops for products using either the ridehailing application or a third party shopping service that partners with the ridehailing service for delivery. The user places an order, and the order is prepared and packed for delivery. In various examples, the order can be prepared and packed at a local business or at a distribution center. In some implementations, a business or vendor can choose to send multiple sizes and/or variations of a product. Sending multiple sizes and/or variations of a product can maximize the probability of a successful purchase without a user having to reorder and wait for another delivery. In some implementations, a business or vendor can choose to send samples of other products with an order.

At step 202, the order delivery request is received by the ridehailing service. The order delivery request can be received when the order is submitted. That is, in various examples, the order delivery request is transmitted to the ridehailing service at the same time as the order is transmitted to the local business and/or distribution center. The order delivery request transmitted to the ridehailing service includes a pick-up address. In some examples, the pick-up address is added to the order by the third party shopping service. In some examples, the pick-up address is registered with the ridehailing application. For example, when an order is placed through the ridehailing application, the ridehailing application already has pick-up information. The order delivery request also includes a delivery address which is specified by the user when the order is placed. At step 204, a ridehailing service autonomous vehicle picks up the order at the pick-up address, from the local business or distribution center.

At step 206, the autonomous vehicle drives the order to the delivery address. The ridehailing service notifies the user when the autonomous vehicle arrives at the delivery address. For instance, the ridehailing application sends a notification to the user mobile device when the autonomous vehicle arrives. In some examples, the ridehailing service sends other notifications, such as a notification with an expected delivery time and/or a notification a few minutes before autonomous vehicle arrival. At step 208, the user identity is authenticated, and the autonomous vehicle is unlocked, allowing the user to enter the vehicle.

Once the user enters the vehicle, the user order is easily accessible for the user to try out. In some examples, the user's order is stored in a compartment within the vehicle. In some examples, when the user identity is authenticated, the compartment (or compartments) containing the order are automatically unlocked, allowing the user to access the compartment(s). In some examples, the compartment(s) include an indication of which ones contain the user order (e.g., a green light on the compartment(s) with the order and, potentially, a red light on the other compartments). In some examples, the compartments are numbered, and the compartment number or numbers corresponding to the compartment(s) with the user order are displayed on the user ridehailing application. In various examples, other items may be included with the user order, such as additional sizes of clothing items, or additional products added by the vendor for the user to try.

At step 210, when the autonomous vehicle arrives as the destination address, if there is an available parking space, the autonomous vehicle parks. If there is not an available parking space, the vehicle stops to pick up the user, and then continues to drive. As explained in greater detail with respect to FIG. 3, if the user can try the ordered product(s) while seated in the vehicle, the autonomous vehicle can continue driving (e.g., circle the block) while the user tries the product. If the user needs to unbuckle to try the product (e.g., trying on clothing), or otherwise prefers that the vehicle park, the autonomous vehicle drives to a parking space.

In various implementations, the cabin interior is optimized for trying out various products. For example, for trying out clothing, the exterior windows can be tinted and/or blacked out for privacy, and interior cabin cameras can be covered (e.g., with moveable shutters). In some examples, a user can flip a switch to close all the camera shutters and/or close window coverings or shades. Additionally, for clothing, jewelry, make-up, or other items that are used on one's person, the cabin can include mirrors allowing a user to view their appearance. If the order includes electronic items, the interior cabin includes outlets for plugging them in to verify functionality (e.g., to verify that string lights are functional or that a device turns on). Furthermore, different surfaces can be provided for trying out various products. In some examples, a small desk and/or table can be provided for various desktop items, an open area can be provided for viewing free standing items, and a bed-like surface can be provided for trying pillows, cushions, bedding, or other similar items.

After trying the product(s), the user can place any items the user wants to return into a compartment in the autonomous vehicle. For example, the user can return any unwanted items into the compartment the user picked up the order from. In another example, the user can return unwanted items into a designated return compartment. When a user returns items to a compartment, the compartment can be automatically locked, and the autonomous vehicle can continue to another delivery and/or route once the user has exited the vehicle and the method 200 is completed. If the unwanted items are properly returned to a compartment, no human intervention is needed between deliveries and/or routes. In some examples, a user simply leaves unwanted items in the vehicle cabin. According to some implementations, no further action is required from the user, and the autonomous vehicle ridehailing service and/or vendor determine which items the user kept and which items the user returned. Additionally, the autonomous vehicle can directly charge the user account for any items kept without asking the user for additional payment details. Since the user identity was authenticated before the user accessed the cabin, the user account information has already been determined.

In various implementations, boxes and/or bags are available to the user for transporting products from the vehicle. Since orders can be delivered inside vehicle compartments, the orders can be available to the user without individual disposable boxes or bags. This can reduce waste and reduce the carbon footprint of delivery. Users can take items without extra packaging or bagging, users can bring their own bags, and/or users can use bags available in the autonomous vehicle.

At step 212, the autonomous vehicle drops off the user. In some examples, the autonomous vehicle drops off the user. In some examples, the autonomous vehicle drops off the user at the delivery address (where the autonomous vehicle picked up the user). In some examples, the autonomous vehicle drops off the user at a different address, as discussed in further detail below with respect to FIG. 4.

At step 214, the autonomous vehicle determines which items from the order were kept by the user. In some examples, the autonomous vehicle determines which items from the order were returned and concludes that the other items were taken. In various implementations, sensors can be used to detect bar codes, RF tags, or other identifying information attached to returned items. In some examples, items are returned to a compartment and later retrieved and cataloged manually. Returned items can be returned to the local business or distribution center by the autonomous vehicle after the delivery or after the autonomous vehicle completes multiple deliveries and/or routes.

In some implementations, the user takes the order to another location to try the ordered product(s), and the autonomous vehicle waits for the user to either confirm that the user is keeping the order or for the user to return part or all of the order to the autonomous vehicle. In various instances, the autonomous vehicle may not be the optimal place to try out a product. For example, when trying out running shoes, a user may want to exit the vehicle to run around the block. In some examples, the user may direct the autonomous vehicle to drive to a running track to try out running shoes. In other examples, the user may take the order inside their home, try the product(s), and then return any unwanted items back to the autonomous vehicle. In some implementations, the autonomous vehicle keeps other user items safe inside the vehicle while the user is away trying a product. In some examples, the autonomous vehicle allows the user to access the vehicle and retrieve their order, waits while the user tries the order, and then, upon receiving a request and/or instruction from the user, either returns to the delivery address to pick up unwanted items or completes the delivery. In various examples, while the vehicle is waiting, the vehicle parks if a parking space is available, or drives if there is no parking space available (e.g., circles the block).

Figure 3:
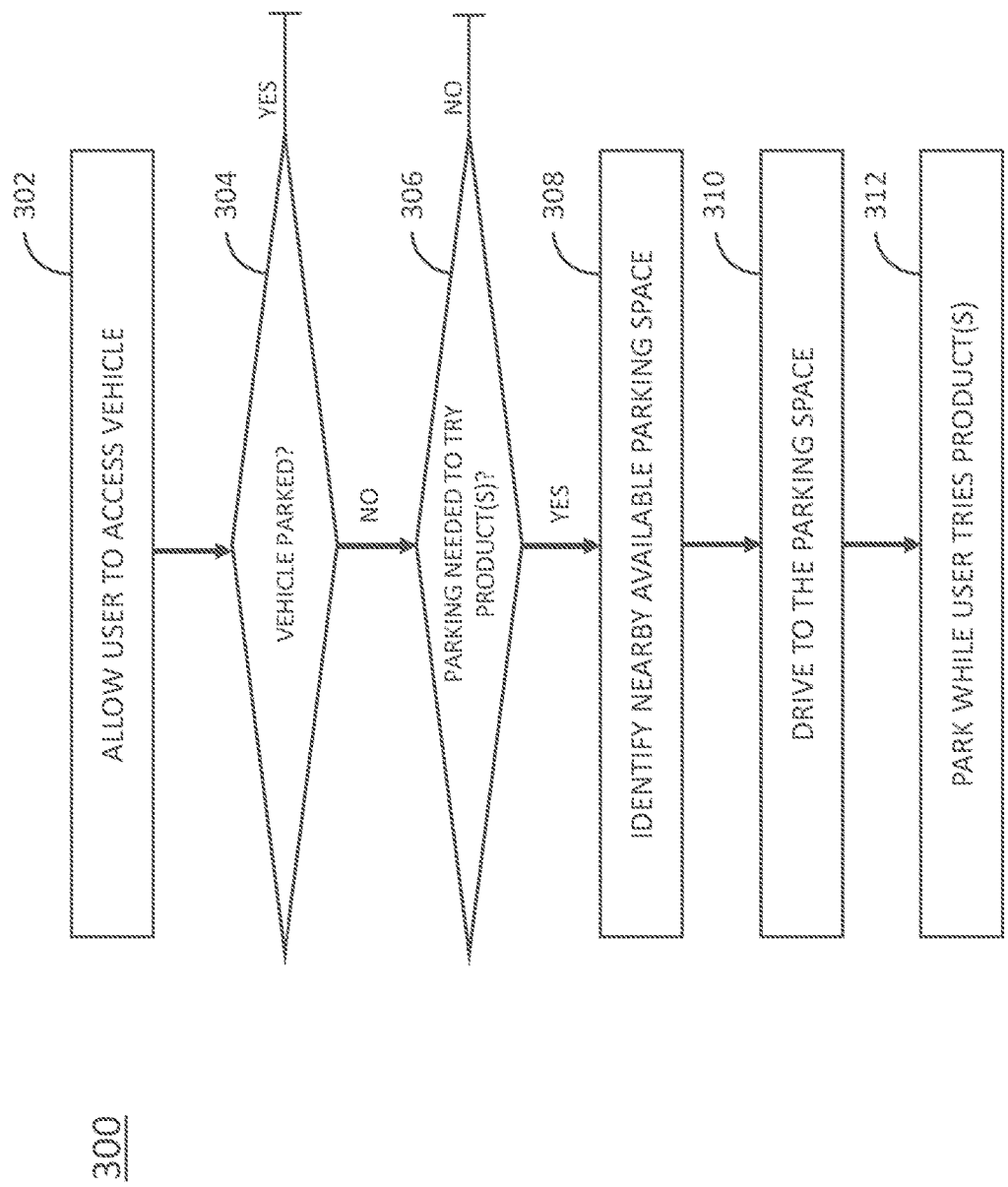
FIG. 3 is a diagram illustrating another method for an autonomous vehicle fitting room, according to some embodiments of the disclosure.

FIG. 3 is a diagram illustrating another method 300 for an autonomous vehicle fitting room, according to various embodiments of the disclosure. In particular, the method 300 is a method for an autonomous vehicle to provide a place to safely try out products. At step 302, the autonomous vehicle authenticates the user and unlocks a vehicle door, allowing the user to access the interior cabin. At step 304, it is determined whether the vehicle is parked in a parking space where the vehicle can remain parked for a selected period of time while the user tries the ordered product(s). If the vehicle is parked, the method 300 ends. If the vehicle is not parked at step 304, at step 306, it is determined whether parking is necessary to try the ordered product(s). In some examples, the ridehailing application sends a prompt to the user's mobile device to inquire whether the user would like the vehicle to park. In some examples, the vendor from which the product was ordered specifies that the autonomous vehicle should be parked to allow a user to try the product. In various examples, to try on clothing, a user will likely want to stand up and thus, the autonomous vehicle must be stationary. In other examples, to try out candle scents, a portable speaker, or jewelry, a user could remain seated and buckled in, allowing the vehicle to circle the block without blocking traffic. In some examples, for many items, including items that can be tried while the vehicle is moving, any type of autonomous vehicle can be used.

If the user prefers to unbuckle to try the product, or otherwise prefers that the vehicle park, the autonomous vehicle drives to a parking space. In particular, at step 308, the autonomous vehicle identifies an available nearby parking space. In some implementations, the autonomous vehicle contacts a central computer and/or routing coordinator for information about nearby parking spaces. In some examples, the autonomous vehicle can detect a nearby parking space from the pick-up location. At step 310, the autonomous vehicle drives to the identified parking space. At step 312, the autonomous vehicle parks, and the user can unbuckle and try the product(s).

Figure 4:
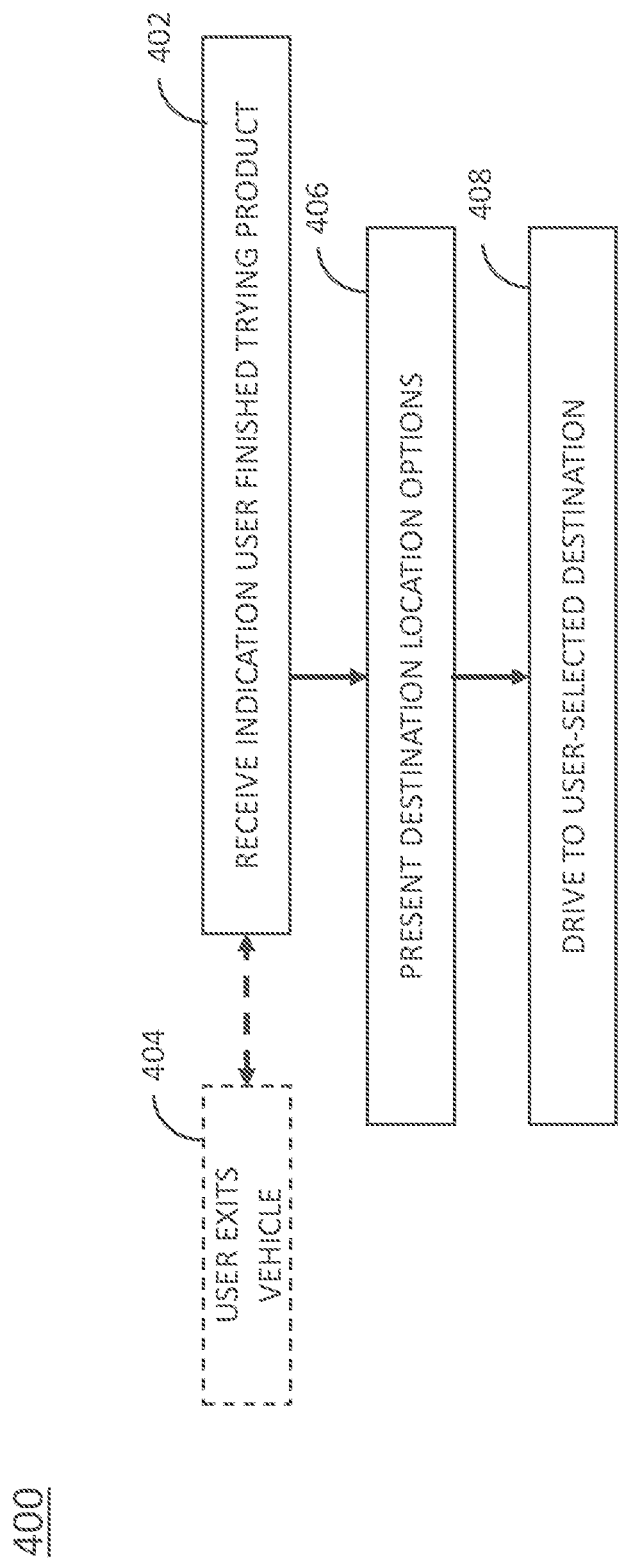
FIG. 4 is a diagram illustrating another method for an autonomous vehicle fitting room, according to some embodiments of the disclosure.

FIG. 4 is a diagram illustrating another method 400 for an autonomous vehicle fitting room, according to various embodiments of the disclosure. In particular, the method 400 is a method for determining an autonomous vehicle action when a user is finished trying a product. At step 402, the autonomous vehicle receives an indication that the user has finished trying the product(s). In some examples, at step 404, the user simply exits the vehicle when they have finished trying the product(s), and the autonomous vehicle proceeds to another route and/or delivery with no other action from the user. In some examples, destination location options are presented on the ridehailing application on the user mobile device. In one example, destination options presented on the user ridehailing application include the pick-up location (if the autonomous vehicle drove to a parking space elsewhere), the vendor location, and an option to specify a different drop-off location. The vendor location can be the local business that fulfilled the order, or, if the order was fulfilled at a third party distribution center, the vendor location can be a local business that sells the ordered products.

In some implementations, if the user decides to ride in the autonomous vehicle to the local business, the user can order ahead and have an item or items ready for trying or picking up when the user arrives at the local business. In some examples, regardless of where the user goes after trying on the items, an in-vehicle tablet provides an interface for the user to shop for more delivery items.

Following is an example of an autonomous vehicle fitting room service. A customer wants to try various sizes of shoes and smell several candles to decide which products to purchase. The customer is not able (or not willing) to easily access a local store to try these in person, so instead the customer uses a ridehailing service application on their mobile device and shops for desired items and variations of desired items. The customer adds the items to their shopping cart in the ridehailing application interface. When checking out, the customer requests an autonomous vehicle fitting room.

The order is placed, an autonomous vehicle arrives at the customer location with the order, and the autonomous vehicle pulls over to a safe parking space. The customer authenticates their identity and enters the autonomous vehicle. Inside the autonomous vehicle are the products ordered by the customer, organized by size or variation for easy recognition. In some examples, the products are inside a compartment or container inside the autonomous vehicle that is automatically unlocked upon customer authentication.

The customer tries out the various shoe sizes and finds the right fit. The customer tries out different candle scents but does not like any of the ones ordered. The candle company sent a few extra different candles and the customer liked one of the extra candles. The customer keeps one pair of shoes and the one candle (not originally ordered) and leaves the rest of the shoes and candles in the compartment where the customer accessed the order. The autonomous vehicle automatically detects which products the customer kept (or which products the customer left in the compartment) using sensors and cameras inside the vehicle. The autonomous vehicle returns to the vendor and/or third party distribution facility with the unwanted items. The customer is charged for the items the customer kept.

In some examples, the autonomous vehicle fitting room can be used to allow a user to try out a mattress for a selected period of time. In one example, an ordered mattress is placed inside an autonomous vehicle fitting room, and a user selects autonomous vehicle fitting room use for one hour. The user can bring a pillow and use the autonomous vehicle fitting room to take a nap on the mattress for the hour, and then the user can decide whether to keep the mattress or return it.

In another example, the autonomous vehicle fitting room can be used to allow a user to try a projector. A local vendor can set up the projector in the autonomous vehicle fitting room, and the autonomous vehicle windows can be blacked out. The user can then select a selected amount of time to use the autonomous vehicle fitting room (e.g., one hour), and can play a selected movie on the projector during that time, while the autonomous vehicle either parks or drives around. In some examples, a user can combine an autonomous vehicle fitting room experience with a ride. For example, if the user is planning a trip to somewhere that is over an hour away, the user can coordinate the trip with the projector fitting room experience, and play the selected movie or otherwise try the product in the autonomous vehicle during the trip.

Example Vehicle for a Fitting Room

Figure 5A:
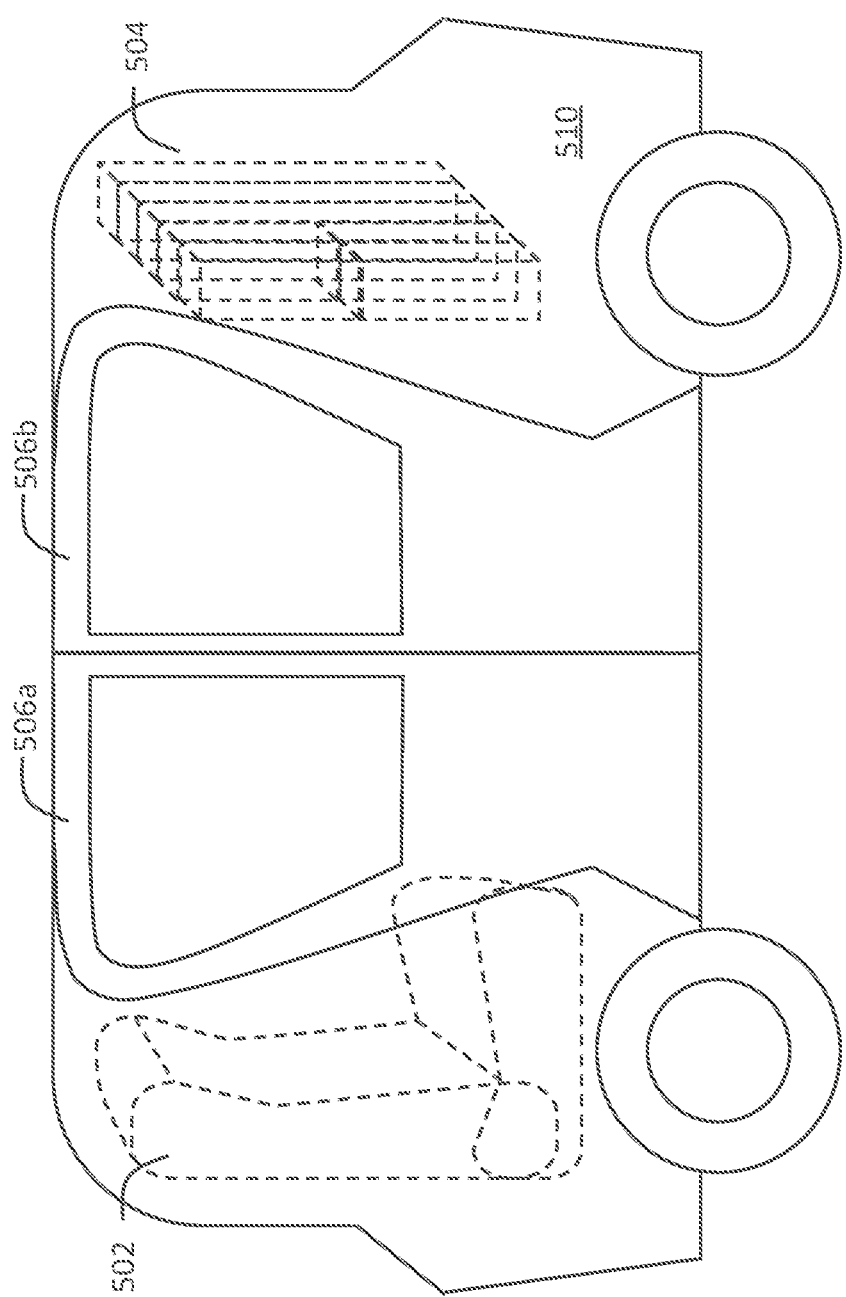
FIGS. 5A-5B are diagrams illustrating autonomous vehicles for providing fitting rooms, according to various embodiments of the disclosure.
Figure 5B:
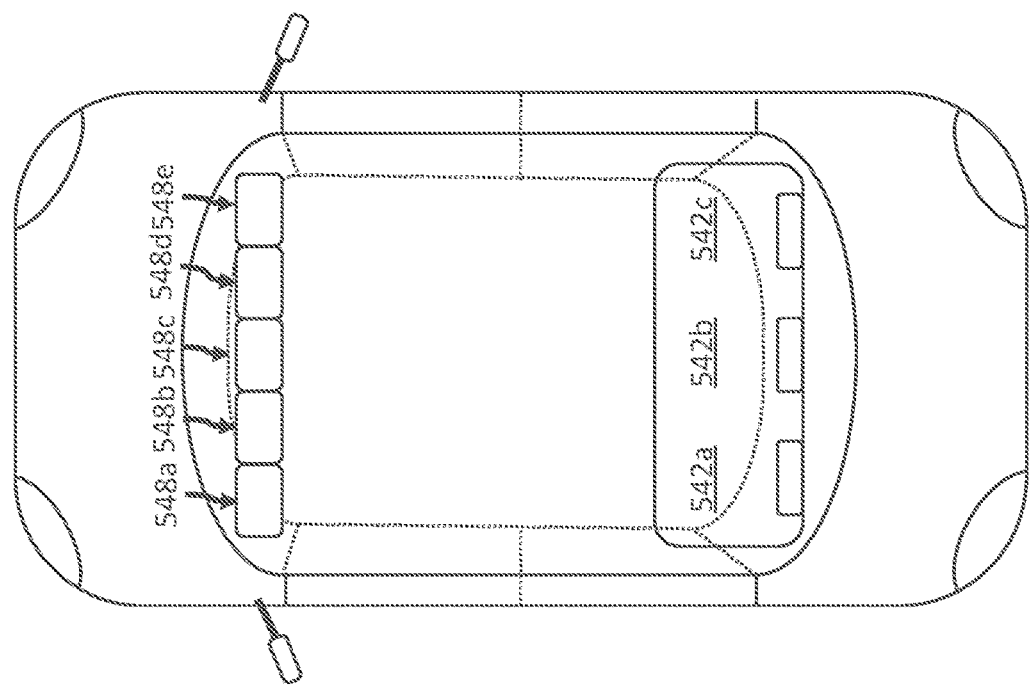

FIGS. 5A-5B are diagrams 500, 540 illustrating various views of an autonomous vehicle 560 for providing an autonomous vehicle fitting room, according to various embodiments of the disclosure. FIG. 5A is a diagram 500 illustrating an autonomous vehicle 510, according to some embodiments of the disclosure. According to various implementations, the autonomous vehicle 510 includes a sensor suite and an onboard computer, as described above with respect to FIG. 1. The autonomous vehicle 510 includes doors 506a, 506b that can slide to open or open outwards. The doors 506a, 506b include windows that have blinds or a black-out feature for privacy inside the vehicle. The autonomous vehicle 510 is an example of a larger vehicle that has a sizeable interior space, which could be used for trying products. For example, the autonomous vehicle 510 could be used as a fitting room to try on clothing. The autonomous vehicle 510 includes a seat 502, where a user can be seated when the autonomous vehicle is not parked. Additionally, the autonomous vehicle 510 includes multiple compartments 504 in which ordered products for multiple users can be stored. In various examples, a user can access a compartment 504 to retrieve an order and try the order inside the vehicle 510

FIG. 5B shows a top view of the autonomous vehicle 510. As shown in FIG. 5B, the autonomous vehicle 510 includes passenger seating 542a, 542b, 542c and multiple containers 548a-548e (indicated generally as 504 in FIG. 5A), which can be used to store user orders. According to various examples, the container 548a-548e that a user's order is stored in is automatically unlocked when a user is authenticated and granted access to the vehicle 510. In various implementations, the containers 548a-548e are temperature-controlled and thus can be used to store various items at selected temperatures, as specified, for example, by the vendor.

Example Device Interface for an Autonomous Vehicle Fitting Room

FIGS. 6A-6D show examples 600, 620, 640, 660 of a device interface for an autonomous vehicle fitting room, according to some embodiments of the disclosure. In particular, FIG. 6A shows an example 600 of a device 602 showing a ridehailing application interface 604 having several options. The options include an option to schedule a ride (first button 606), an option to order take-away food (second button 608), and an option to shop (third button 610). In various examples, when a user selects the third button 610, the interface 604 provides a shopping site. In some examples, the shopping site allows a user to make a selection to shop at a specific store. In particular, the ridehailing application interface can feature local businesses, and when a local business is selected, items available from the business are displayed in the interface. Additionally, the interface 604 can provide a search option which can be used to search for items either at a selected business or across the shopping site.

FIG. 6B is an example 620 of the device 602 showing an example of a checkout window in the ridehailing application interface 604, according to some embodiments of the disclosure. As shown in FIG. 6B, the checkout window includes a shopping cart total 622, a delivery address 624, an autonomous vehicle fitting room option 626, and a delivery date and time selection 628. In some examples, if a user selects the shopping cart button 622, the shopping cart is expanded to show all the items in the user's shopping car. Similarly, if the user selects the delivery address button 624, the user can change the delivery address.

The autonomous vehicle fitting room button 626 includes a selection button 630, which a user can slide to the left to turn off the fitting room option, or slide to the right to turn on the fitting room option. In some examples, when a user turns on the autonomous vehicle selection button 630 the user is given the option to select various fitting room features, such as a mirror, window shades, camera covers, a desk, a table, an outlet, a bed, or other features. In the example shown in FIG. 6B, the user has selected a mirror, window shades, and camera coverings. In other examples, as part of the fitting room feature, the user is given the option to have the AV drive to a specific location for trying an item, such as a track for trying sneakers, a rock-climbing gym for trying rock-climbing equipment, or a pool for trying goggles or other swimming equipment.

The checkout window also includes a delivery date and time selection button 628. When the user selects a delivery day, specific time options are presented to the user on that day. In some examples, when a user selects the fitting room option, the user may take some time using the fitting room to try the ordered products. Thus, in contrast to typical "quick" deliveries, the user may want to find and select a specific day and time when the user is available to use the fitting room for a selected period of time.

FIG. 6C shows an example 640 of the ridehailing application interface 604 showing options presented to a user after the user has accessed the fitting room and tried various items, according to various embodiments of the disclosure. In particular, after accessing an order, a user can simply exit the autonomous vehicle, or the user can select one of the buttons 642, 644, 646. In some examples, the autonomous vehicle drove to a different location from the delivery location. For example, if there was no parking available at the delivery location, and the user preferred not to be seated and buckled while trying items in the order, the autonomous vehicle may have driven to a parking space. In other examples, as discussed above, the user may have instructed the autonomous vehicle to drive to a specific location for trying the order (e.g., a track to try out running shoes). Thus, if the autonomous vehicle drove to a different location, the first button 642 presents the user with the option to return to the pick-up location.

In some examples, the user may choose to visit the vendor of one or more products in the order. The user may want to see additional vendor product options in person. The second button 644 presents the user with the option to drive to the product vendor. If the order included items from more than one vendor, selecting the second button 644 loads another interface on which the user can choose the vendor to drive to. In some examples, the user can select the third button 646 and drive to a different location entirely. In various examples, the third button 646 presents the user with the option to take the autonomous vehicle to any selected destination.

FIG. 6D shows an example 660 of a mobile device shopping application interface 664 showing shipping options presented to a user when the user is ready to place an order, according to various embodiments of the disclosure. In various examples, the ridehailing service partners with a third party shopping application, such that the third party shopping application presents users with the option for autonomous vehicle delivery and the option for an autonomous vehicle fitting room at delivery. The shipping method box 672 shows various shipping options in a third party shopping application, including an option for autonomous vehicle delivery in an autonomous vehicle having a fitting room. In some examples, a user is presented with an option for "regular" autonomous vehicle delivery as well as an option for an autonomous vehicle fitting room. When checking out from a third party shopping application, users can select an autonomous vehicle fitting room and try products in the autonomous vehicle fitting room at delivery as described herein.

Example of Autonomous Vehicle Fleet

FIG. 7 is a diagram 700 illustrating a fleet of autonomous vehicles 710a, 710b, 710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. The central computer also acts as a centralized ride management system and communicates with ridehailing users via a ridehailing service 706. The vehicles 710a-710c can each be used to implement autonomous vehicle fitting room methods of FIGS. 2-4. In some implementations, the autonomous vehicles 710a-710c communicate directly with each other.

When a passenger requests a ride through a ridehailing service 706, the ridehailing service 706 sends the request to central computer 702. The central computer 702 selects an autonomous vehicle 710a-710c based on the request. In various examples, the request includes a request for a fitting room, and an autonomous vehicle 710a-710c having a fitting room matching any requested parameters is selected. For example, some requests may specify an autonomous vehicle 710a-710c that is large enough for a user to stand and try on clothing, some requests may specify an autonomous vehicle 710a-710c that is large enough to fit a mattress for trying, some requests may specify an autonomous vehicle 710a-710c having a mirror is available but the user can be seated while trying the product (e.g., jewelry). Some requests have no special parameters (e.g., trying various scented candles) and can be filled by any available autonomous vehicle 710a-710c. Additionally, some requests simply ask that the vehicle drive to a location for trying out the product (e.g., a track to try running shoes, or a climbing wall to try climbing equipment) and any available autonomous vehicle 710a-710c can be used to fulfill the request.

When an autonomous vehicle travels to a destination for trying a product, the routing coordinator can optimize the routes to avoid traffic as well as overall fleet vehicle occupancy. In various implementations, since the routing coordinator has information on the routes for all the vehicles in the fleet, the routing coordinator can adjust vehicle routes to reduce congestion and increase vehicle occupancy. The routing coordinator can also optimize routes for the autonomous vehicles 710a-710c from the order pick-up location to the delivery location.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a destination.

Example of a Computing System for Ride Requests

Figure 8:
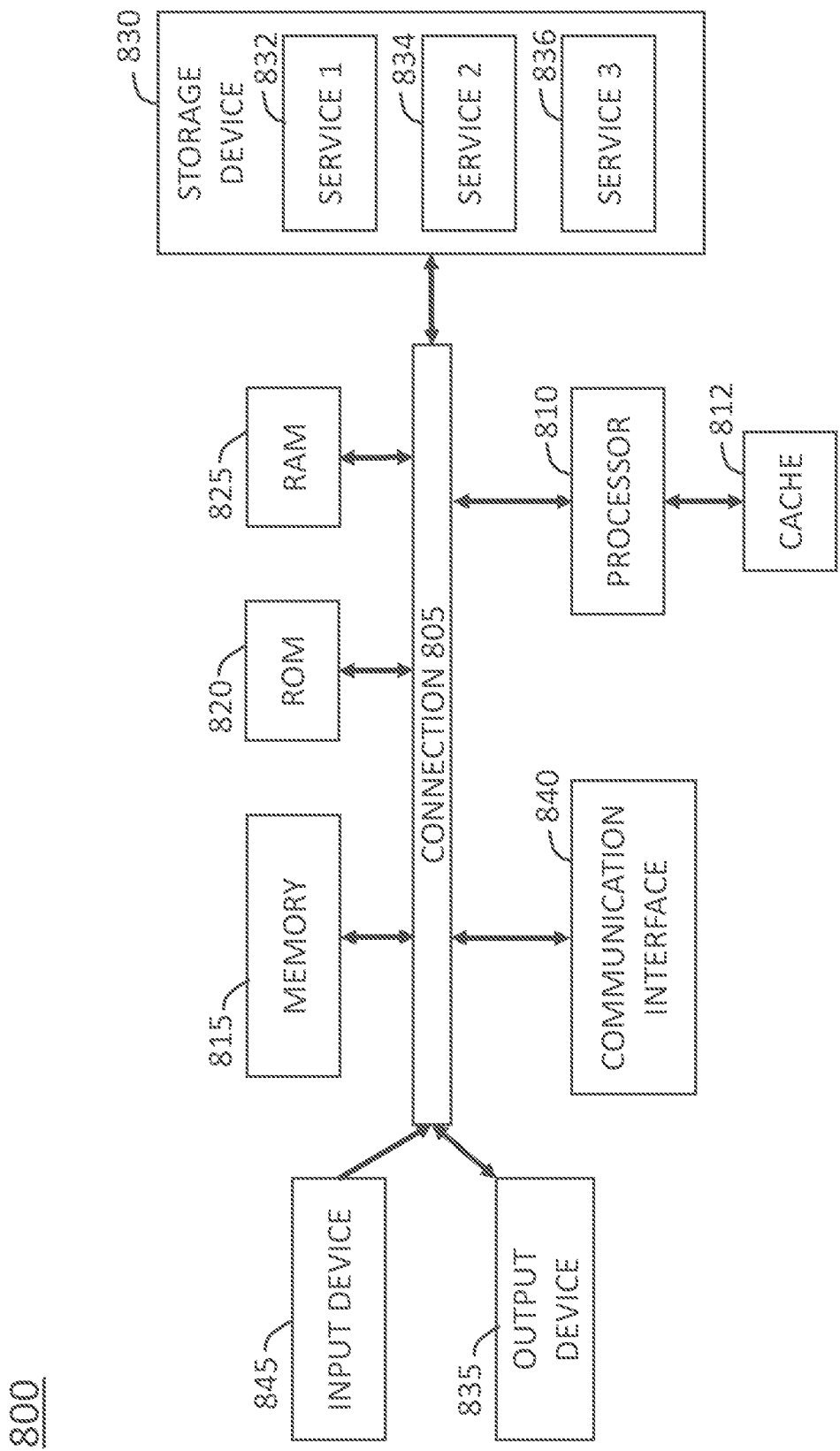
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for providing a fitting room in an autonomous vehicle, comprising: arriving at a delivery location with an order; authenticating user identity; unlocking a vehicle door, allowing user access to an interior cabin and the order; providing an environment for trying the order; and determining, when the interior cabin is vacated, whether at least a portion of the order remains inside the interior cabin.

Example 2 provides a method according to one or more of the preceding and/or following examples, wherein the portion is a first portion and further comprising, when the first portion of the order remains inside the interior cabin: identifying the first portion of the order for return; determining a second portion of the order was removed; and charging a user account for the second portion of the order, wherein the user account corresponds with the user identity.

Example 3 provides a method according to one or more of the preceding and/or following examples, further comprising determining whether to park the autonomous vehicle based on at least one of a user request, an order type, and parking space availability.

Example 4 provides a method according to one or more of the preceding and/or following examples, further comprising driving to a selected location, dropping off a user with at least one item from the order, and waiting for user return.

Example 5 provides a method according to one or more of the preceding and/or following examples, wherein the selected location includes one of a running track and a pool.

Example 6 provides a method according to one or more of the preceding and/or following examples, further comprising locking vehicle doors after dropping off the user at the selected location to keep other items safe in vehicle while user tries the at least one item from the order.

Example 7 provides a method according to one or more of the preceding and/or following examples, wherein providing an environment for trying the order further comprises at least one of triggering window tinting and physically blocking camera lenses.

Example 8 provides a method according to one or more of the preceding and/or following examples, wherein providing an environment for trying the order further comprises providing at least one of a mirror, an outlet, a table, a desk, and a bed.

Example 9 provides a method according to one or more of the preceding and/or following examples, further comprising receiving an order delivery request including the delivery location and a fitting room request.

Example 10 provides a method according to one or more of the preceding and/or following examples, wherein receiving the order delivery request comprises receiving an order submission including the order delivery request through a ridehailing application.

Example 11 provides a method according to one or more of the preceding and/or following examples, wherein receiving the order delivery request comprises receiving the order delivery request and an order pick-up location from a third party.

Example 12 provides a method according to one or more of the preceding and/or following examples, further comprising unlocking a container in the autonomous vehicle, wherein the order is in the container.

Example 13 provides a method according to one or more of the preceding and/or following examples, further comprising presenting a first option to drive to a local business, wherein the local business filled the order.

Example 14 provides a method according to one or more of the preceding and/or following examples, wherein the order is a first order, and further comprising presenting a second option to place an additional order for pick-up at the local business.

Example 15 provides an autonomous vehicle for providing a fitting room, comprising: an interior cabin having a space configured to provide an environment for trying an order; a plurality of containers, wherein a first container of the plurality of containers holds the order; a plurality of sensors configured to detect items in the interior cabin; and an onboard computer configured to: authenticate a user identity, unlock a vehicle door and the first container, allowing user access to the interior cabin and the order; and determine, when the interior cabin is vacated, whether at least a portion of the order remains inside the interior cabin, based on data from the plurality of sensors.

Example 16 provides an autonomous vehicle according to one or more of the preceding and/or following examples, wherein the interior cabin includes at least one of window shades, window tinting, camera lens covers, a mirror, an outlet, a table, a desk, and a bed.

Example 17 provides an autonomous vehicle according to one or more of the preceding and/or following examples, wherein the portion is a first portion and wherein, when the first portion of the order remains inside the interior cabin, the onboard computer is further configured to: identify the first portion of the order for return; determine a second portion of the order was removed from the autonomous vehicle; and charge a user account for the second portion of the order, wherein the user account corresponds with the user identity.

Example 18 provides a system for providing a fitting room in an autonomous vehicle fleet, comprising: an online portal configured to receive an order delivery request including a pick-up location, a delivery location, and a fitting room request; and a central computing system configured to: receive the order delivery request; select an autonomous vehicle having a fitting room from the autonomous vehicle fleet; and schedule the selected autonomous vehicle to pick-up an order corresponding to the order delivery request from the pick-up location, drive to the delivery location, and wait a selected period of time during user access to the fitting room.

Example 19 provides a system according to one or more of the preceding and/or following examples, wherein, following order delivery by the autonomous vehicle, the central computing system is further configured to: receive order feedback from the autonomous vehicle, wherein the order feedback includes a determination of whether at least a portion of the order was removed from the autonomous vehicle, and, if at least the portion of the order was removed, an identification of items in the portion; and if at least the portion of the order was removed, charge a user account for the items in the portion.

Example 20 provides a system according to one or more of the preceding and/or following examples, wherein the online portal is further configured to receive the order delivery request from one of a ridehailing application and a third party.

Example 21 provides a system according to one or more of the preceding and/or following examples, wherein the fitting room request includes fitting room details including at least one of window shades, window tinting, camera lens covers, a mirror, an outlet, a table, a desk, and a bed.

Example 22 provides a system according to one or more of the preceding and/or following examples, wherein the fitting room request includes a fitting room location, and wherein the onboard computing system is further configured to schedule the selected autonomous vehicle to drive from the delivery location to the fitting room location.

Example 23 provides a method and/or system according to one or more of the preceding and/or following examples, wherein the order is unpackaged, and further comprising providing a bag for placing the order in.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for providing a fitting room in an autonomous vehicle, comprising:
   arriving at a delivery location with an order in an autonomous vehicle including a sensor suite including localization, driving, and imaging sensors configured to generate sensor data;
   authenticating user identity;
   unlocking a vehicle door, allowing user access to an interior cabin and the order, wherein the interior cabin includes the fitting room;
   determining that a set of products corresponding to the order that are available in the autonomous vehicle require the autonomous vehicle to be stationary for the user to try out the set of products;
   determining, in response to determining that the set of products require the autonomous vehicle to be stationary for the user to try out the set of products, an available parking space for the autonomous vehicle, wherein determining the available parking space for the autonomous vehicle includes:
      determining, based on the sensor data, whether there is an available parking space at the delivery location where the autonomous vehicle can remain parked for a selected period of time;
      identifying, in response to determining that there is not an available parking space at the delivery location, a nearby parking space based away from the delivery location, at least in part, on the sensor data; and
      autonomously controlling the autonomous vehicle, via an onboard computer configured to control vehicle operations and functionality, and via a throttle interface configured to control vehicle movement, to drive from the delivery location to the nearby parking space;
   providing an environment for trying the order at the nearby parking space;
   waiting a selected period of time at the nearby parking space during user access to the fitting room; and
   determining, when the interior cabin is vacated, whether at least a portion of the order remains inside the interior cabin.

2. The method of claim 1, wherein the portion is a first portion and further comprising, when the first portion of the order remains inside the interior cabin:
   identifying the first portion of the order for return;
   determining a second portion of the order was removed; and
   charging a user account for the second portion of the order, wherein the user account corresponds with the user identity.

3. The method of claim 1, further comprising determining to park the autonomous vehicle in the nearby parking space based on at least one of a user request, an order type, and parking space availability.

4. The method of claim 1, further comprising driving to a selected location, dropping off a user with at least one item from the order, and waiting for user return.

5. The method of claim 1, wherein providing the environment for trying the order further comprises at least one of triggering window tinting and physically blocking camera lenses.

6. The method of claim 1, wherein providing the environment for trying the order further comprises providing at least one of a mirror, an outlet, a table, a desk, and a bed.

7. The method of claim 1, further comprising receiving an order delivery request including the delivery location and a fitting room request.

8. The method of claim 7, wherein receiving the order delivery request comprises receiving an order submission including the order delivery request through a ridehailing application.

9. The method of claim 7, wherein receiving the order delivery request comprises receiving the order delivery request and an order pick-up location from a third party.

10. The method of claim 1, further comprising unlocking a container in the autonomous vehicle, wherein the order is in the container.

11. The method of claim 1, further comprising presenting a first option to drive to a local business, wherein the local business filled the order.

12. The method of claim 11, wherein the order is a first order, and further comprising presenting a second option to place an additional order for pick-up at the local business.

13. The method of claim 1, further comprising:
   transmitting a request for locations of available parking spaces to a central computing system; and
   receiving at least one available parking space location from the central computing system,
   wherein the at least one the available parking space location includes the nearby parking space.

14. An autonomous vehicle for providing a fitting room, comprising:
   an interior cabin having a space configured to provide an environment for trying an order;
   a plurality of containers, wherein a first container of the plurality of containers holds the order;
   a plurality of sensors configured to detect items in the interior cabin; and
   an onboard computer configured to:
      authenticate a user identity,
      unlock a vehicle door and the first container, allowing user access to the interior cabin and the order;
      determine that a set of products corresponding to the order that are available in the autonomous vehicle require the autonomous vehicle to be stationary for the user to try out the set of products;
      determining, in response to determining that the set of products require the autonomous vehicle to be stationary for the user to try out the set of products, an available parking space for the autonomous vehicle, wherein determining the available parking space for the autonomous vehicle includes:
         determine, based on exterior vehicle sensor data, whether there is an available parking space at a delivery location where the autonomous vehicle can remain parked for a selected period of time;
         identify, in response to determining that there is not an available parking space at the delivery location, a nearby parking space based away from the delivery location, at least in part, on the sensor data; and autonomously control the autonomous vehicle to drive from the delivery location to the nearby parking space;

provide the environment for trying the order in the interior cabin at the nearby parking space;

wait a selected period of time at the nearby parking space during user access to the interior cabin; and determine, when the interior cabin is vacated, whether at least a portion of the order remains inside the interior cabin, based on data from the plurality of sensors.

15. The autonomous vehicle of claim 14, wherein the interior cabin includes at least one of window shades, window tinting, camera lens covers, a mirror, an outlet, a table, a desk, and a bed.

16. The autonomous vehicle of claim 14, wherein the portion is a first portion and wherein, when the first portion of the order remains inside the interior cabin, the onboard computer is further configured to:

identify the first portion of the order for return;

determine a second portion of the order was removed from the autonomous vehicle; and charge a user account for the second portion of the order, wherein the user account corresponds with the user identity.

* * * * *